United States Patent
Ho et al.

(10) Patent No.: US 11,466,972 B2
(45) Date of Patent: Oct. 11, 2022

(54) SYSTEMS AND METHODS FOR DETECTING BATTERY SYSTEM SWELLING IN INFORMATION HANDLING SYSTEMS

(71) Applicant: DELL PRODUCTS L.P., Round Rock, TX (US)

(72) Inventors: Shao-Szu Ho, New Taipei (TW); Shih-Chang Hu, New Taipei (TW); Wen-Yung Chang, Jhong Li (TW); Chin-Yuan Chiang, Sanchong (TW)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 16/859,015

(22) Filed: Apr. 27, 2020

(65) Prior Publication Data

US 2021/0333084 A1 Oct. 28, 2021

(51) Int. Cl.
| | |
|---|---|
| *G01B 7/02* | (2006.01) |
| *G06F 1/18* | (2006.01) |
| *G06F 1/16* | (2006.01) |
| *G06F 3/041* | (2006.01) |
| *H02J 7/00* | (2006.01) |
| *G08B 21/18* | (2006.01) |
| *G06F 3/044* | (2006.01) |
| *G01D 5/241* | (2006.01) |

(52) U.S. Cl.
CPC .............. *G01B 7/023* (2013.01); *G01D 5/241* (2013.01); *G06F 1/1616* (2013.01); *G06F 1/189* (2013.01); *G06F 3/044* (2013.01); *G06F 3/0416* (2013.01); *G08B 21/18* (2013.01); *H02J 7/0047* (2013.01)

(58) Field of Classification Search
USPC ......................................... 324/426, 660–663
See application file for complete search history.

(56) References Cited

U.S. PATENT DOCUMENTS

| | | |
|---|---|---|
| 7,436,149 B2 | 10/2008 | Luo et al. |
| 7,595,609 B2 | 9/2009 | Wang et al. |
| 7,826,189 B1 | 11/2010 | Edwards |
| 9,917,335 B2 | 3/2018 | Jarvis et al. |

(Continued)

OTHER PUBLICATIONS

Staunton, "AC Shield Enchances Remote Capacitive Sensing", Analog.com, Printed from Internet Feb. 23, 2020, 3 pgs.

(Continued)

*Primary Examiner* — Vincent Q Nguyen
(74) *Attorney, Agent, or Firm* — Egan, Enders & Huston LLP.

(57) ABSTRACT

Systems and methods may be implemented separately from (and external to) a battery system to detect swollen battery system components within a chassis enclosure of the information handling system, without any physical contact with the battery cells or battery system, and without requiring premature opening of the information handling system chassis enclosure to inspect for battery system swelling. A system user may be automatically warned of detected battery system swelling and/or battery system charging may be automatically terminated upon detected battery system swelling so that information handling system failure and/or system service costs that would otherwise be expended to repair damage caused by swollen battery system components may be prevented.

24 Claims, 6 Drawing Sheets

(56) References Cited

U.S. PATENT DOCUMENTS

| | | |
|---|---|---|
| 10,496,509 B2 | 12/2019 | Thompson et al. |
| 10,574,233 B2 | 2/2020 | Casparian et al. |
| 2014/0002269 A1 | 1/2014 | Zhou |
| 2016/0149270 A1 | 5/2016 | Albert et al. |
| 2018/0261824 A1* | 9/2018 | Ju .................. H01M 10/48 |
| 2019/0097278 A1* | 3/2019 | Park ................ H02J 50/005 |
| 2020/0203783 A1* | 6/2020 | Ringuette ........ H01M 10/425 |
| 2021/0226264 A1* | 7/2021 | Bytheway ......... H01M 10/48 |

OTHER PUBLICATIONS

Pratt, "Capacitance Sensors For Human Interfaces To Electronics Equipment", Analog.com, Printed from Internet Feb. 23, 2020, 10 pgs.

EDN, "EDN-Electrode Design In Capacitive Touch Sensor Application", EDN.com, Printed from Internet Feb. 23, 2020, 6 pgs.

Embedded, "Performance Versus Power In Capacitive Touch Sensing Designs", Embedded.com, Printed from Internet Feb. 23, 2020, 7 pgs.

\* cited by examiner

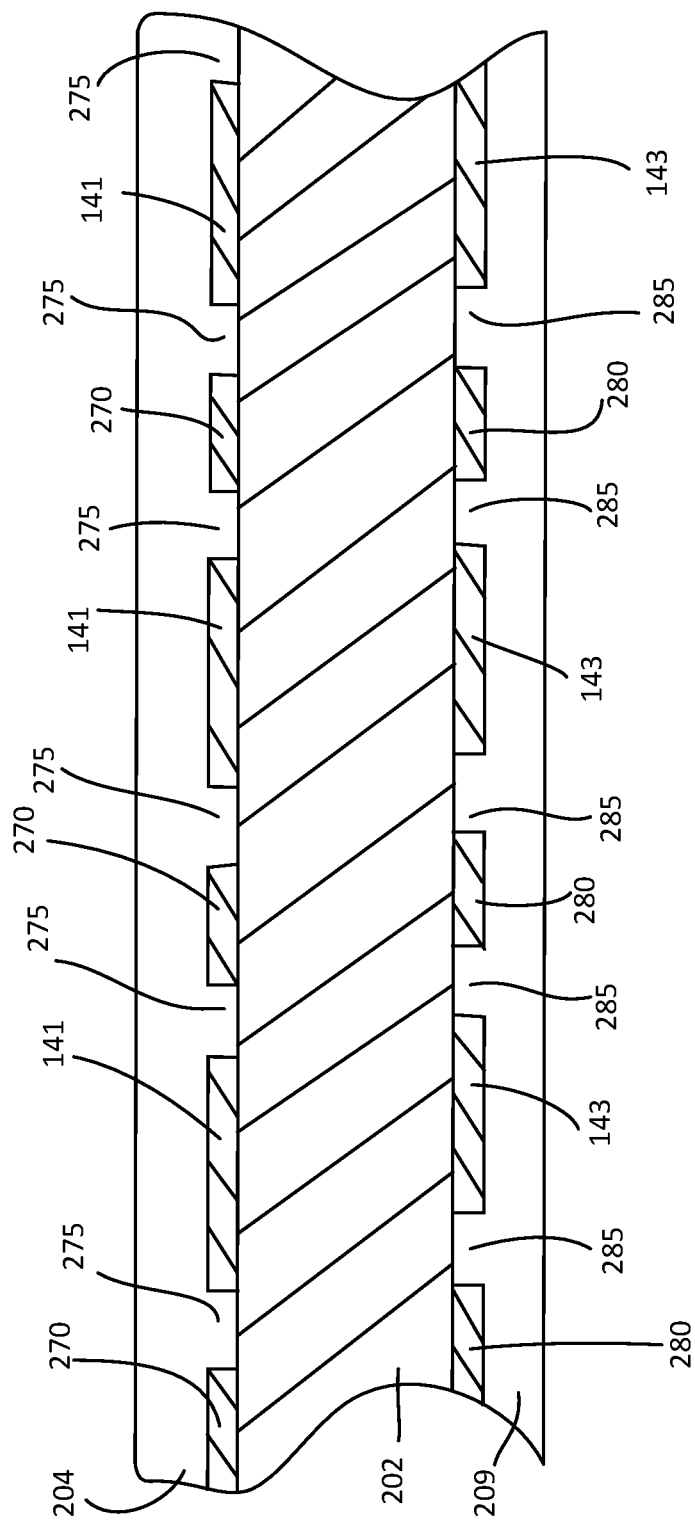
FIG. 2B (Section A-A)

SYSTEMS AND METHODS FOR DETECTING BATTERY SYSTEM SWELLING IN INFORMATION HANDLING SYSTEMS

FIELD

This invention relates generally to information handling systems and, more particularly, to detecting swollen batteries in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems (e.g., notebook and laptop computers, smart cell phones and tablet computers) are powered by embedded internal battery packs. Inner battery cells of such internal battery packs sometimes swell due to outgassing of a flammable electrolyte mixture when they are over heated, over charged, or simply failing due to old age. Since the battery pack is embedded within the system, a system user will not be aware of internal battery pack swelling until signs of the battery swelling are noticeable on the exterior of the system, at which time internal damage due to the battery pack swelling may have already occurred. If the swelling is minor, a user may simply notice that the backside of the system case seems slightly distorted. However, if the swelling is more serious, it can distort the system structure directly and render the system unusable.

SUMMARY

Disclosed herein are systems and methods configured to detect swollen battery system (e.g., battery pack) components within the chassis enclosure (e.g., outer case) of an information handling system (e.g., notebook computer, laptop computer, tablet computer, smart phone, etc.). The disclosed systems and methods may be so implemented separately from (and external to) the battery system, and without physically contacting the battery system, to proactively and reliably detect occurrence of internal battery cell swelling that is out of specification, as well as to protect any existing system keyboard and/or prevent touchpad malfunction due to battery system swelling and resulting distortion of information handling system components, without modification to the battery system and without requiring any physical contact with the battery cells or battery system and without requiring premature opening of the information handling system chassis enclosure to inspect for battery system swelling. In one embodiment a system user may be automatically warned of detected battery system swelling and/or battery system charging may be automatically terminated upon detected battery system swelling so that information handling system failure and/or system service costs that would otherwise be expended to repair damage caused by swollen battery system components may be advantageously prevented.

In one embodiment, the disclosed systems and methods may be implemented using a dual function touchpad (or trackpad) system having a set of downwardly-facing integrated proximity sensors to detect swelling of an internal battery system within an information handling system, and also having an upwardly-facing set of integrated touch sensors to receive user input to a touchpad surface of the same information handling system by detecting presence and movement of a user's fingers on a touchpad surface of the touchpad system. In one implementation of such an embodiment, the proximity sensor/s may be mounted on the underside or bottom side of a printed circuit board (PCB) and the touch sensor/s may be mounted on an opposing upper side or top side of the same printed circuit board (PCB). In such an implementation, the touchpad system may utilize a single microcontroller to separately monitor signals from both the touch sensor/s and the different proximity sensor/s. In this way, both battery system swelling and touchpad input may be detected by the same microcontroller without requiring added costs for any additional programmable integrated circuit/s (e.g., microcontroller/s) or PCB material as compared to a conventional touchpad system that is provided only with upwardly-facing touch sensors on one side (i.e., upper side) of a PCB and that are configured to only sense user touchpad input.

In one embodiment, battery system swelling may be automatically detected by a microcontroller of the touchpad that is programmed and coupled by a circuit path to communicate with a host programmable integrated circuit (e.g., system central processing unit of the information handling system) to provide and early warning by causing generation of an alarm (e.g., displayed automatic alarm text message or other suitable alarm action) to alert a system user when any battery system swelling is detected (or alternatively when a particular amount of battery system swelling exceeds an predefined acceptable amount or threshold of swelling is detected). In any case, a system user may be automatically apprised of detected battery system swelling so that the system user may take preventive action to prevent battery swelling-induced damage to other components of the information handling system, e.g., by having the battery system replaced before such damage occurs and therefore extending life of the information handling system. This embodiment may also be implemented to prevent unnecessary disassembly of the information handling system for battery system inspection, since battery system swelling is automatically monitored without requiring opening of the information handling system chassis enclosure.

In one respect, disclosed herein is a method, including detecting swelling of a battery system contained within a chassis enclosure of an information handling system without physically contacting the battery. The method may include: sensing a proximity of the battery system to a first location within the chassis enclosure, the first location being separate from and external to the battery system; detecting swelling of the battery system by determining if the sensed proximity of the battery system indicates existence of battery system swelling; and taking at least one first action only upon determining swelling of the battery system exists, and not taking the at least one first action if no swelling of the battery system is determined to exist.

In another respect, disclosed herein is an information handling system, including: a battery system contained within a chassis enclosure; at least one proximity sensor that does not physically contact the battery system and that is positioned at a first location that is separate from and external to the battery system, the proximity sensor sensing physical proximity of the battery system to the proximity sensor and producing a first signal that is representative of the sensed proximity of the battery system; and at least one programmable integrated circuit coupled to receive the first signal from the at least one proximity sensor. The at least one programmable integrated circuit may be programmed to: detect swelling of the battery system by determining if the sensed proximity of the battery system indicates existence of battery system swelling; and take at least one first action only upon determining swelling of the battery system exists, and not take the at least one first action if no swelling of the battery system is determined to exist.

BRIEF DESCRIPTION OF THE DRAWINGS

FIG. 2B illustrates a simplified partial cross-sectional view of a touchpad system according to one exemplary embodiment of the disclosed systems and methods.

DESCRIPTION OF ILLUSTRATIVE EMBODIMENTS

Figure 1:
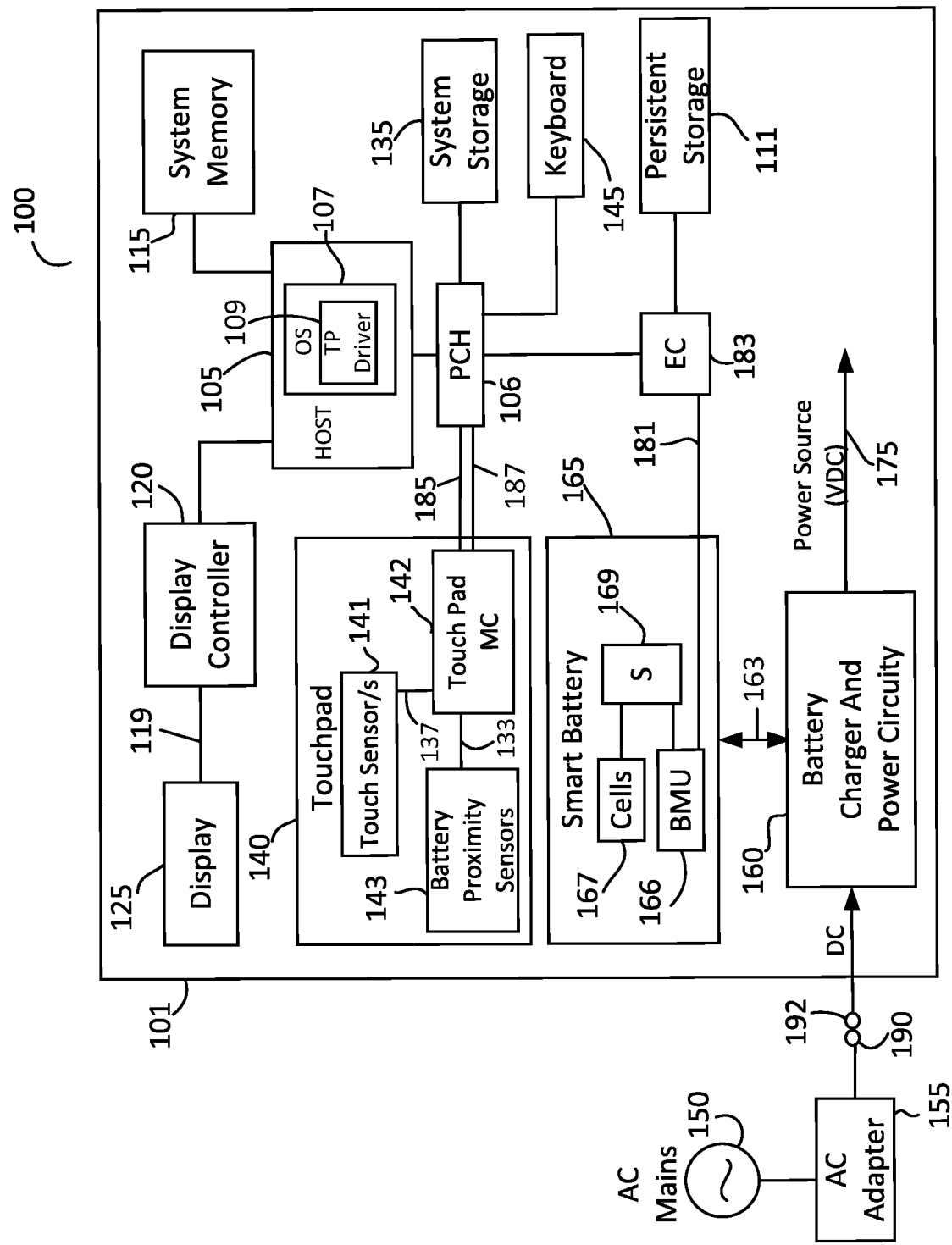
FIG. 1 illustrates a block diagram of an information handling system according to one exemplary embodiment of the disclosed systems and methods.

FIG. 1 is a block diagram of an information handling system 100, such as a notebook computer, laptop computer, convertible computer, tablet computer or any other information handling system having a touchpad configured for sensing user touch input. In FIG. 1, information handling system 100 is configured with various components within an outer chassis enclosure 101 (e.g., such as plastic and/or metal enclosure of a notebook computer, tablet computer, convertible computer, or other computer device having a touchpad) according to one exemplary embodiment of the disclosed systems and methods. It will be understood that the embodiment of FIG. 1 is exemplary only, and that other in other embodiments an information handling system may include additional, fewer and/or alternative components suitable for a given application including other programmable integrated circuits such as discrete graphics processing units (GPUs), etc.

As shown in FIG. 1, information handling system 100 of this exemplary embodiment includes a host processing device or host programmable integrated circuit 105 (e.g., central processing unit "CPU" such as an Intel Pentium series processor, an Advanced Micro Devices (AMD) processor or one of many other processors currently available) which may be coupled together with a platform controller hub (PCH) 106 and/or computer data bus/es. Other examples of host programmable integrated circuits 105 include any other suitable one or more programmable integrated circuits such as microcontroller, microprocessor, ASIC, programmable logic device "PLD" such as FPGA, complex programmable logic device "CPLD", etc. In one embodiment, host programmable integrated circuit 105 may be configured to execute an operating system (OS) such as Windows-based operating system, Linux-based operating system, etc.

In the illustrated embodiment, system memory 115 (e.g., dynamic random access memory "DRAM") and a display controller 120 may be coupled as shown to host programmable integrated circuit 105, and a display device 125 (e.g., video monitor or display screen) may be coupled to display controller 120 to provide visual images (e.g., via graphical user interface) to the user, e.g., via eDP components such as eDP cable and eDP connector. System storage 135 (e.g., one or more media drives such as hard drive, solid state drive "SSD", etc.) may be coupled as shown to host programmable integrated circuit 105 via PCH 106 to provide permanent or non-volatile storage for the information handling system 100.

Still referring to FIG. 1, optional input devices 145 (e.g., such as a keyboard, mouse, etc.) may also be coupled via PCH 106 to host programmable integrated circuit 105 to enable the user to interact with the information handling system (e.g., in the case of notebook or laptop computer, etc.). In some embodiments, display device 125 may include a touchscreen for also accepting user input. An embedded controller (EC) 183 may also be coupled to PCH 106 as shown, and may be configured to perform various tasks such as battery and power management, I/O control, etc. Persistent storage 111 (e.g., embedded and partitioned flash memory, Electrically Erasable Programmable Read Only Memory—EEPROM, etc.) may be coupled to EC 183 for storing persistent information for EC 183.

In the embodiment of FIG. 1, information handling system 100 is coupled to an external source of power, namely AC mains 150 through AC adapter 155. It will be understood that external power may be alternatively provided from any other suitable external source (e.g., external DC power source) or that AC adapter 155 may alternatively be integrated within an information handling system 100, e.g., such that AC mains 150 supplies AC power directly to components inside chassis enclosure 101 of information handling system 100. In the illustrated embodiment, AC adapter 155 is removably coupled to, and separable from, battery charger/power circuitry 160 of information handling system 100 at mating interconnection terminals 190 and 192 in order to provide information handling system 100 with a source of DC power to supplement DC power provided across power conductor/s 163 by battery cells 167 of a battery system 165 in the form of smart battery pack, e.g., lithium ion ("Li-ion") or nickel metal hydride ("NiMH") battery pack.

Battery system 165 may include one or more rechargeable batteries (with each battery containing battery cells 167) and a BMU 166 that itself may include, for example, an analog front end ("AFE"), storage (e.g., non-volatile memory) and microcontroller. BMU 165 may be coupled to control switching circuitry 169 (e.g., metal-oxide-semiconductor field-effect transistors "MOSFET") within battery system 165 to control flow of charging and discharging current from battery cells 167. Battery charger/power circuitry 160 of information handling system 100 may provide one or more DC power source/s 175 to corresponding power bus/es for powering a system load (power-consuming components) of information handling system 100. Battery charger/power circuitry 160 may also provide DC power across power conductor/s 163 for charging battery cells 167 of the battery system 165 during charging operations.

As further shown in FIG. 1, a battery system data bus (e.g., SMBus) 181 may be coupled to battery system 165 to provide real time and/or stored information (e.g., battery system operating conditions such as battery current and voltage) from BMU 166 of battery system 165 to EC 183 and to other components such as programmable integrated circuit 105. EC 183 may also provide data and/or commands across data bus 181 to BMU 166 of battery system 165 (e.g., to instruct BMU 166 to control operation of switching circuitry 169 within battery system 165).

Battery system 165 may be contained within a cavity of a battery compartment that is defined within chassis enclosure 101 and positioned adjacent (e.g., beneath or underneath) touchpad (or trackpad) system 140 as illustrated and described further herein. In one such embodiment, battery system 165 may be an interchangeable or user-replaceable battery pack that is provided with external power and data connector terminals for contacting and making temporary (e.g., non-soldered) interconnection with mating power connector terminals and data connector terminals provided within the battery pack compartment, e.g., to exchange power through power conductors 163 with circuitry 160 of the information handling system 100, as well as to exchange data across data bus 181 with EC 183 and host programmable integrated circuit 105 of the information handling system 100. In another embodiment, battery system 165 may be a non-replaceable or permanent battery pack that is enclosed (or captured) within information handling system chassis enclosure 101 and may have power connector terminals and data connector terminals that are optionally soldered to power conductors 163 and data bus 181.

Further information with respect to example operation and configuration of battery system 165 may be found, for example, in U.S. Pat. No. 7,595,609, in U.S. Pat. No. 7,436,149, and in U.S. Pat. No. 10,496,509, each of which is incorporated herein by reference in its entirety for all purposes. Further information with respect to touchpad configuration within an information handling system may be found, for example, in U.S. Pat. No. 10,574,233, which is incorporated herein by reference in its entirety for all purposes.

Figure 2A:
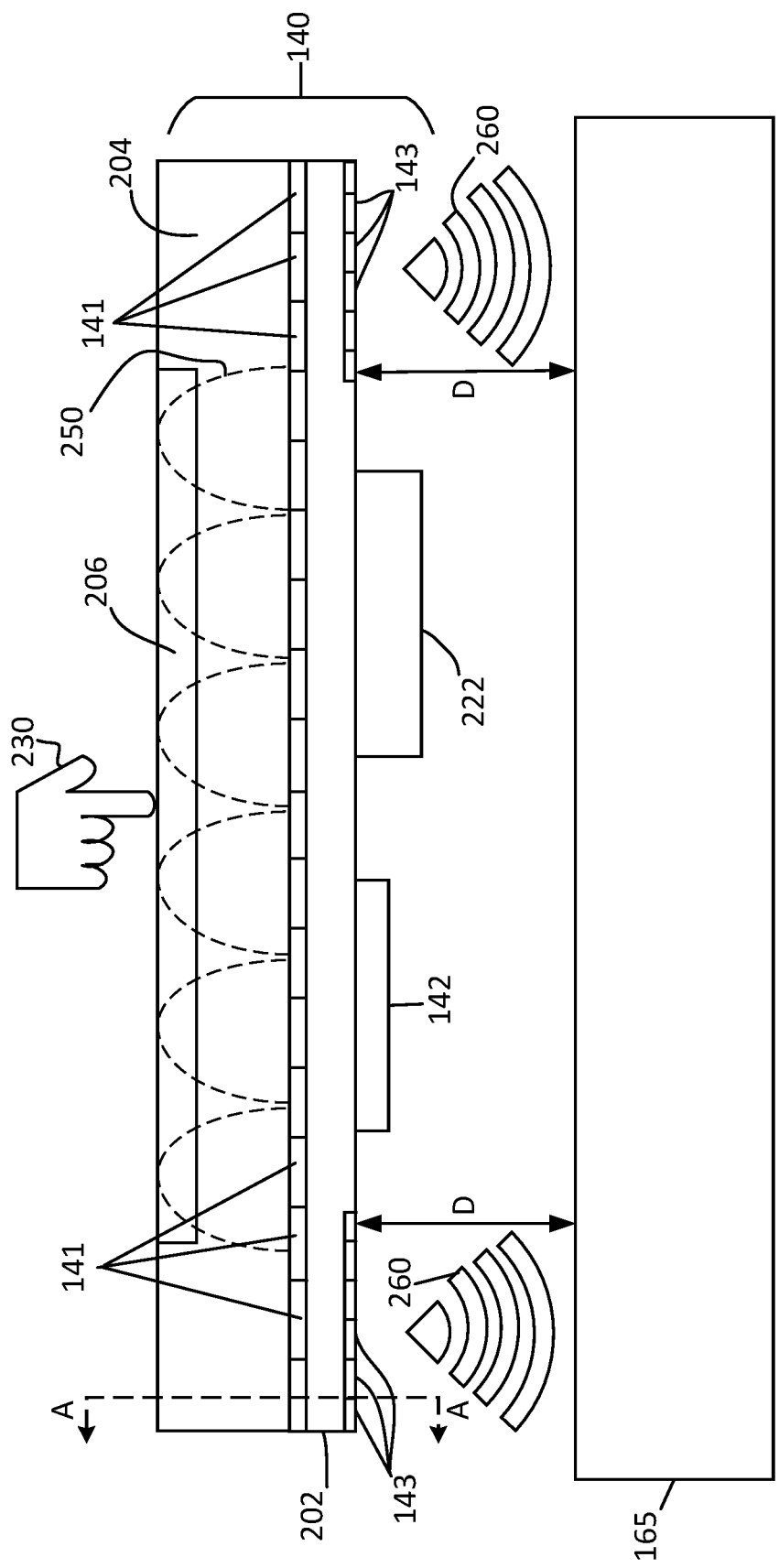
FIG. 2A illustrates an edge cross-sectional view of a touchpad system and battery system according to one exemplary embodiment of the disclosed systems and methods.

As shown in FIG. 1, a touchpad system 140 is also provided as shown for receiving user input on an external surface of the chassis enclosure 101. Touchpad system 140 includes one or more capacitive touch sensor electrode/s 141 configured to sense the real time presence and position of a user's finger that is touching an external touchpad surface of touchpad system 140. In one embodiment, multiple capacitive touch sensor electrode/s 141 may be provided as a matrix of electrically-conductive electrodes laid out in a pattern on an upper side of a printed circuit board (PCB) dielectric, and each surrounded by a ground plane 270, e.g., as shown in FIGS. 2A and 2B.

A touchpad microcontroller 142 and associated integrated circuitry may be coupled as shown to provide a voltage excitation from a voltage driver of associated circuitry of microcontroller 142 to each of the electrodes and to sense resulting real time capacitance between each electrode and the ground plane at the X-Y position of each electrode (which will include added capacitance resulting from the presence of a user's finger at the X-Y position of the user's finger on the external touchpad surface of the touchpad system 140) as an analog signal 137. Touchpad microcontroller 142 is also programmed to convert this sensed capacitance and corresponding electrode position information to a digital signal 185 that is provided through PCH 106 to other programmable integrated circuits of information handling system 100, e.g., such as host programmable integrated circuit 105 and/or EC 183.

In the embodiment of FIG. 1, host programmable integrated circuit 105 may load and execute an operating system (OS) 107 (e.g., Microsoft Windows, Linux, Android, etc.) and a touchpad driver 109 that host programmable integrated circuit 105 may load and execute a touchpad driver 107 that receives digital signals 185 and 187, and otherwise processes input and configuration of how this digital data 185 and 187 is processed by host programmable integrated circuit 105.

As further shown in FIG. 1, touchpad system 140 may include one or more additional capacitive proximity sensor electrode/s 143 that do not contact the battery system 165, that are positioned separate from (and external to) the battery system 165, and that are configured to sense changes in physical proximity of component/s of battery system 165 to the capacitive proximity sensor electrode/s 143. Capacitive proximity sensor electrode/s 143 may be one or more electrically-conductive electrodes laid out in a pattern on the lower side of the printed circuit board (PCB), with each electrode surrounded by a ground plane, e.g., as shown and described in relation to FIGS. 2A, 2B and 2C. Each of capacitive proximity sensor electrode/s 143 may be configured similar to capacitive touch sensors 141 described above, and may be coupled to touchpad microcontroller 142 and associated circuitry in a similar manner. As is the case with capacitive touch sensor electrode/s 141, voltage driver circuitry associated with associated with touchpad microcontroller 142 provides a voltage excitation to an electrode of each of capacitive proximity sensor electrode/s 143, and senses resulting real time capacitance between electrode/s of capacitive proximity sensor electrode/s 143 and other nearby components including the ground plane and one or more components of battery system 165. As will be described further herein, sensed capacitance at capacitive proximity sensor electrode/s 143 will increase as the one or more component/s or surface/s of battery system 165 move into closer proximity to capacitive proximity sensor electrode/s 143. This sensed capacitance at capacitive proximity sensor electrode/s 143 is provided as an analog signal 133 to touchpad microcontroller 142, which in turn converts the sensed capacitance of signal 133 to a digital signal 187 that is separate from the digital signal 185 provided for capacitive touch sensor electrode/s 141, and provides this digital signal 187 to EC 183 via PCH 106.

FIG. 2A illustrates an edge cross-sectional view of touchpad system 140 as it may be configured according to one exemplary embodiment. As shown, touchpad system 140 includes a matrix of multiple upwardly-facing capacitive touchpad sensor electrode/s 141 mounted on an upper side (or top side) of a touchpad system PCB 202 (e.g., FR-4, polyester (PET), Teflon (PTFE), Flex, etc.). In this embodiment, touchpad sensor electrode/s 141 are covered by a palmrest material 204 that may be constructed of one or more materials such as plastic, rubber, fiberglass, etc. A touchpad layer 206 (e.g., Mylar, glass, etc.) is inset within palmrest material 204 over touchpad sensor electrode/s 141 in a position within capacitance-sensing range 250 of touchpad sensor electrode/s 141 so that real time capacitance and position of one or more electrically-conductive fingers of a user's hand 230 may be sensed through touchpad layer 206 when a user places them in contact with touchpad layer 206 above touchpad sensor electrode/s 141 as shown.

Still referring to FIG. 2A, separate matrices of multiple downwardly-facing capacitive proximity sensor electrode/s 143 are mounted on an opposing underside (or bottom side) of PCB 202 over a surface of battery system 165 in a position so that an electric field 260 extends downward toward battery system 165 from each of the matrices of multiple downwardly-facing capacitive proximity sensor electrode/s 143 as shown. The presence of underlying components of battery system 165 within electric field/s 260 causes the capacitance sensed at proximity sensor electrode/s 143 to vary as a function of the distance "D" between capacitive proximity sensor electrode/s 143 and the underlying components of battery system 165.

When no electrically conductive portion of battery system 165 is present in the electrical field of capacitive proximity sensor electrode/s 143, the capacitive proximity sensor electrode/s 143 only sense an inherent capacitance value created by the interaction of their electrical field with the environment, in particular with ground plane areas. However, when electrically-conductive component/s of battery system 165 come into closer proximity to capacitive proximity sensor electrode/s 143, the electrical field around the capacitive proximity sensor electrode/s 143 is modified and the total capacitance seen by the capacitive proximity sensor electrode/s 143 increases by the cell capacitance. Specifically, metal or other electrically conductive materials of battery system 165 interacts when in close proximity with excited proximity sensor electrode/s 143 to increase the capacitance magnitude sensed by proximity sensor electrode/s 143. The magnitude of this sensed capacitance is dependent on the relative distance "D" between proximity sensor electrode/s 143 and battery system 165, with the magnitude of sensed capacitance increasing as the distance "D" decreases between proximity sensor electrode/s 143 and upwardly-facing surface of battery system 165.

In the illustrated embodiment of FIG. 2A, proximity sensor electrode/s 143 are configured to sense a capacitance value that is indicative of the distance "D" existing between proximity sensor electrode/s 143 and the upwardly-facing surface of battery system 165 when the components of the battery system 165 are swollen. In FIG. 2A, battery system 165 is shown in an unswollen condition so that distance "D" (shown by the doubled-sided arrows in FIG. 2A) is greater than the range of electric field 260. In one embodiment, such an unswollen value of distance "D" may be from 0.5 millimeter to 1 millimeter, although greater and lesser unswollen distance values are alternatively possible. When battery system 165 swells upward toward touchpad system 140, distance "D" will decrease until electrically-conductive component/s of battery system 165 come into maximum capacitance-sensing range of electric field 260 (e.g., less than 0.5 millimeter or other greater or lesser distance value corresponding to the electric field range of the particular proximity sensor electrode/s 143 and the sensing resolution of the particular touchpad microcontroller 142) where they are detected by increased sensed capacitance, which indicates that battery system 165 has swollen.

Figure 4:
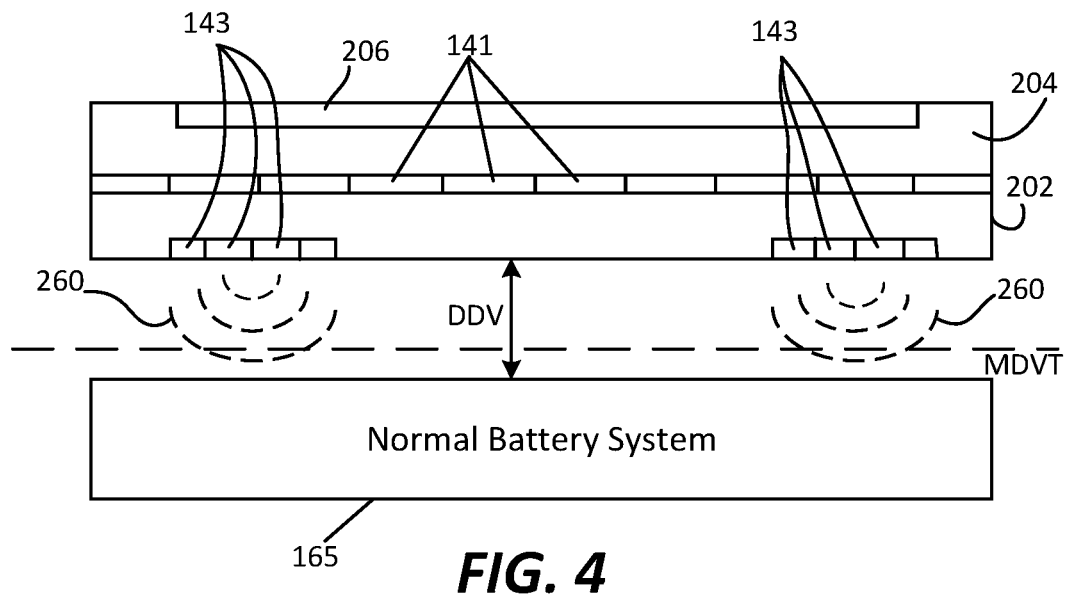
FIG. 4 illustrates an edge cross-sectional view of a touchpad system and a battery system to one exemplary embodiment of the disclosed systems and methods.

In a further embodiment, a correlation between magnitude of capacitance sensed by proximity sensor electrode/s 143 and varying values of distance "D" may be predetermined (e.g., using empirical measurement or computer simulation) in the laboratory or factory by a system manufacturer or assembler, and then stored (e.g., as a lookup table) in system non-volatile storage. In such an embodiment, an unacceptable swollen condition of battery system 165 may be determined to exist when the determined distance "D" has reached a predefined minimum distance threshold value (e.g., less than 0.5 millimeter or any other suitable greater or lesser predefined distance value). In such an embodiment, the maximum capacitance-sensing range of electric field 260 (e.g., such as 10 millimeters or other greater or lesser distance value) may be greater than the distance "D" when the battery system 165 is in an unswollen condition. In one exemplary embodiment, resolution of sensed distance may be seven microns although greater or lesser sensed distance resolutions are possible. Embodiments for detection of swelling of battery system 165 are described further herein with regard to FIGS. 4 and 5.

Also shown mounted on the underside of PCB 202 of FIG. 2A is touchpad microcontroller 142, and a connector 222 which is configured to couple to a mating system-side connector for connection to the system motherboard to provide respective data paths for communicating digital signals 185 and 187 between touchpad microcontroller 142 and PCH 106. Advantageously, this embodiment may employ the same microcontroller and connector as provided for a conventional touchpad PCB, meaning that the functionality of these two components may be employed without the added cost and work for providing additional programmable integrated circuits or connectors on the touchpad PCB to enable the disclosed battery swelling detection capability.

It will be understood that the illustrated configuration of separate matrices of multiple capacitive proximity sensor electrode/s 143 is exemplary only, and that any number of one or more multiple capacitive proximity sensor electrode/s 143 may be provided that are suitable for detecting battery swelling.

It will also be understood that in other embodiments, capacitive proximity sensor electrode/s and associated ground plane may be similarly provided on a PCB that is not part of a touchpad system 140, but that is otherwise suitably positioned relative to a battery system of an information handling system (with the capacitive proximity sensor electrode/s facing the battery system in the manner shown in FIG. 2A) to sense swelling of battery system component/s in a similar manner as described in relation to FIG. 2A. One example of such an embodiment may be implemented for an information handling system (e.g., notebook computer, laptop computer, etc.) that includes a touchpad, but in which the capacitive proximity sensor electrode/s are mounted on a PCB positioned adjacent the battery system but that is separate and different from another PCB upon which the touchpad sensor electrode/s 141 are mounted. Another example of such an embodiment may be implemented for an information handling system (e.g., smart phone, tablet computer, etc.) that does not include a touchpad, and in which the capacitive proximity sensor electrode/s are mounted on a PCB positioned adjacent the battery system of the information handling system. In other embodiments, one or more programmable integrated circuits of an information handling system that are separate and different from a touchpad controller may be provided for exciting the capacitive proximity sensor electrode/s, and for receiving a sensed capacitance signal from the capacitive proximity sensor electrode/s and converting it into a digital signal that may be processed and acted upon in similar manner as described herein.

FIG. 2B illustrates a simplified partial cross-sectional view of section A-A of FIG. 2A, showing some components of touchpad system 140. Shown in FIG. 2B are individual capacitive proximity sensor electrodes 143 and a ground plane 280 which may both be present as part of a conductive circuit layout on a lower surface of PCB 202. As shown, a dielectric or insulating gap 285 is formed to surround each capacitive proximity sensor electrode 143 and separate (insulate) it from ground plane 280. An overlay material 209 (e.g., plastic or other dielectric material) may be present to fill insulating gap 285 and cover battery sensor electrode 143 and ground plane 280.

Further shown in FIG. 2B are individual capacitive touch sensor electrodes 141 and ground plane 220 which may both be present as part of a conductive circuit layout on the opposing upper surface of PCB 202. As shown, a dielectric or insulating gap 275 is formed to surround each touch sensor electrode 141 and separate (insulate) it from ground plane 270. In one embodiment, electrically-conductive electrode structures for sensor electrode/s 141 and 143 (as well as respective electrically-conductive ground planes 270 and 280) may be formed from respective separate copper layers (or other suitable conductive circuit layers such as a layer of silver, conductive carbon, etc.) that are laid out and patterned on the respective opposing upper and lower surfaces of PCB 202 to form the components thereof.

Figure 2C:
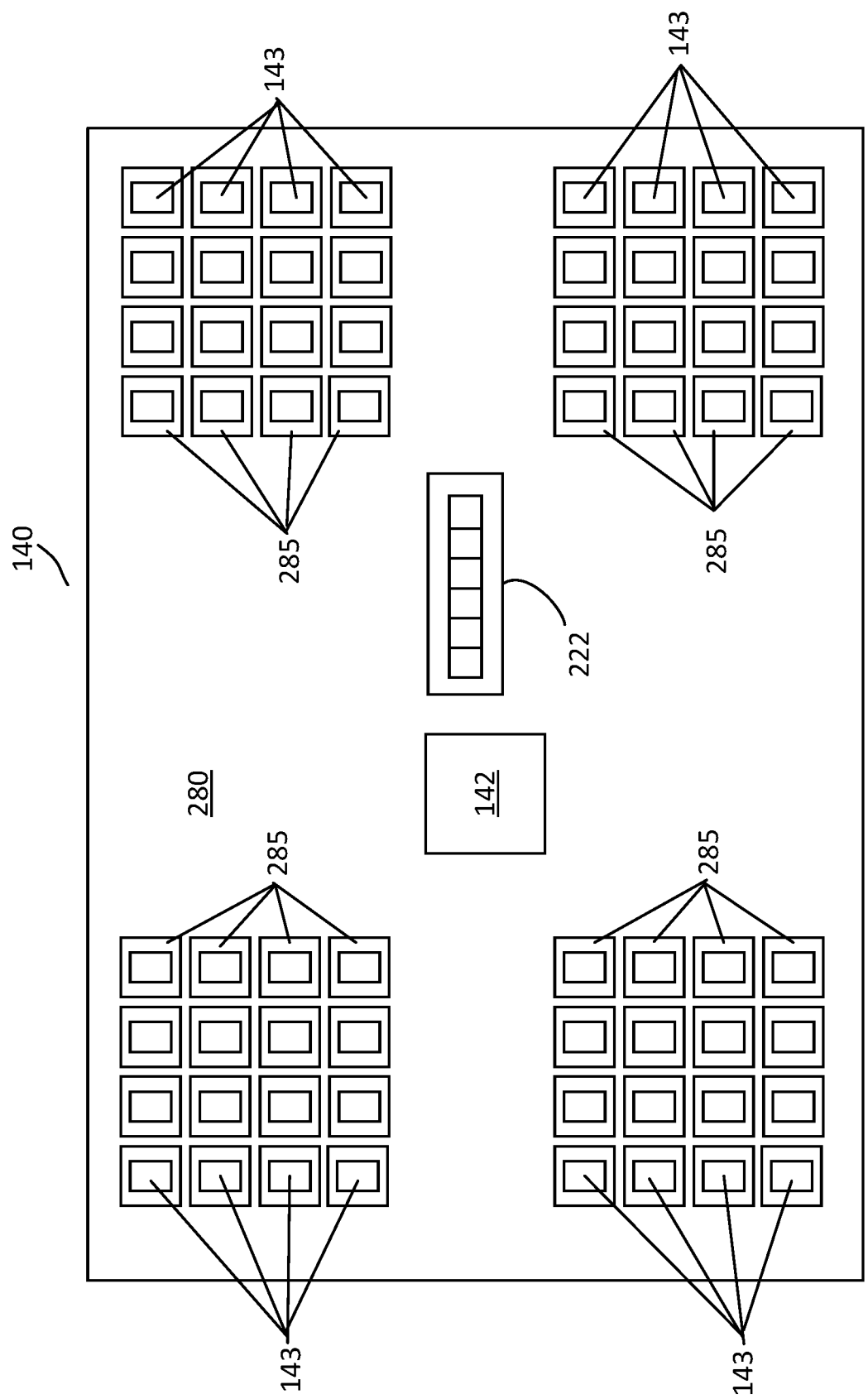
FIG. 2C illustrates a simplified underside view of components of a touchpad system according to one exemplary embodiment of the disclosed systems and methods.

FIG. 2C illustrates a simplified underside view of components of touchpad system 140 illustrated in the exemplary embodiment of FIGS. 2A and 2B. FIG. 2C shows how each of capacitive proximity sensor electrode/s 143 are electrically-separated from ground plane 280 by respective insulating gaps 285. In the illustrated embodiment of FIG. 2C, four separate matrices of capacitive proximity sensor electrode/s 143 are illustrated. However, it will be understood that any other number and/or layout geometry of one or more multiple capacitive proximity sensor electrode/s 143 (and/or one or more matrices of capacitive proximity sensor electrodes 143) may be provided that are suitable for detecting battery swelling. Moreover, it is not necessary that capacitive proximity sensor electrode/s 143 be laid out in a matrix pattern, e.g., one or more stand-alone individual capacitive proximity sensor electrode/s 143 may alternatively be provided.

Figure 3:
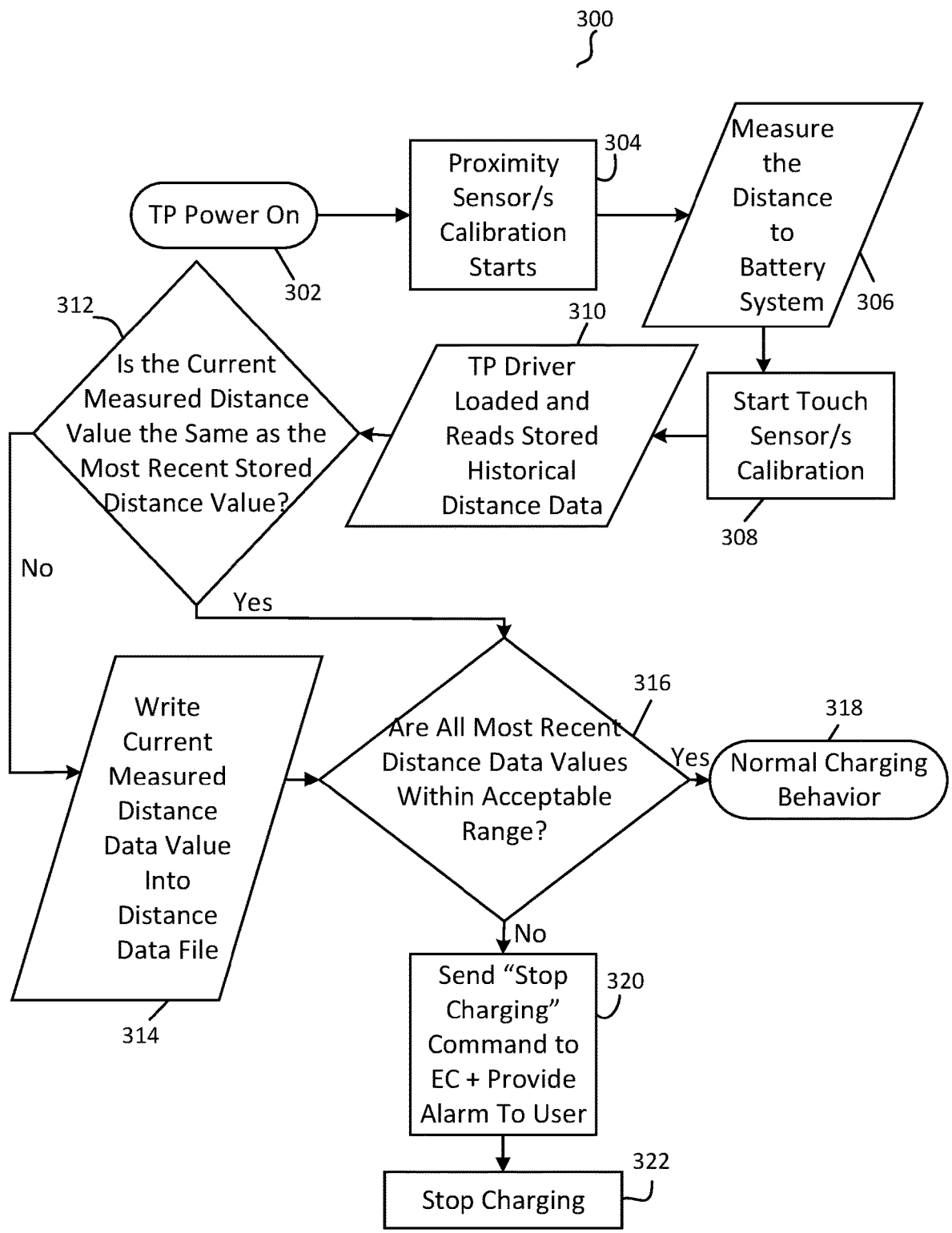
FIG. 3 illustrates methodology according to one exemplary embodiment of the disclosed systems and methods.

FIG. 3 illustrates one exemplary embodiment of methodology 300 as it may be implemented to automatically detect swollen component/s of a battery system 165 (e.g., such as a battery pack) inside outer chassis enclosure 101 of an information handling system 100, and to respond to detection of such swollen battery components by automatically providing an alarm to a system user and/or automatically disabling charging of the battery cells 167 of battery system 165. As shown, methodology 300 starts in step 302 with power on of touchpad system 140 and EC 183 (e.g., upon powering on and boot of information handling system 100). During system boot, touchpad microcontroller 142 executes firmware or other logic to receive an analog signal 133 representing the current capacitance magnitude that is sensed at capacitive proximity sensor electrode/s 143. At this time, touchpad microcontroller 142 calibrates proximity sensor electrode/s 14 in step 304.

Next, in step 306, the current sensed capacitance magnitude of analog signal 133 is converted into a digital signal 187 by touchpad microcontroller 142 and provided to EC 183, which in turn converts the sensed capacitance magnitude to a distance data value (DDV) which is the value of the current distance "D" (i.e., proximity) between the proximity sensor electrode/s 143 and a designated component (e.g., upwardly-facing surface) of battery system 165. In one embodiment, EC 183 may make this conversion using a stored predetermined correlation between sensed capacitance and varying distances "D" that have been previously stored on system non-volatile storage as described herein in relation to FIG. 2A.

Next, in step 308, capacitive touch sensor electrode/s 141 are calibrated by touchpad microcontroller 142. In step 310, a touchpad driver for touchpad system 140 is next loaded during system boot to OS runtime by host programmable integrated circuit 105. The touchpad driver executes in step 310 on host programmable integrated circuit 105 to read previously-stored distance data values from persistent storage 111 or other suitable non-volatile storage such as system storage 135. In one embodiment, each of these successively-measured distance data values may have been previously obtained by performance of step 306 during previous system boots in a similar manner as described for the currently-measured distance data value of current step 306, and then stored in corresponding step 314 described further below.

Next, in step 312 the touchpad driver executes on host programmable integrated circuit 105 to determine if the current measured distance data value provided by EC 183 from current step 306 is the same as the single most recent stored previous distance data value contained in the previously-stored history of successive previously measured distance data values that were read in step 310 from persistent storage 111 or other suitable non-volatile storage such as system storage 135.

If in step 312, the current measured distance data value from current step 306 is found to be the same as the single most recent stored previous distance data value of the stored history of successive previously measured distance data values read in step 310, then methodology 300 proceeds to step 316 described further below.

However, if the current measured distance data value from current step 306 is found in step 312 not to be the same as the single most recent stored previous distance data value of the stored history of successive previously measured distance data values read in step 310, then methodology 300 proceeds to step 314 by causing EC 183 to store the determined value of the current distance "D" as a distance data value, e.g., on persistent storage 111 or other suitable non-volatile storage such as system storage 135. In one embodiment of step 314, the current distance data value may be appended to a stored history of successive previously measured distance data values that are maintained on persistent storage 111 or other suitable non-volatile storage such as system storage 135. Each of these successively-measured distance data values may have been obtained by performance of step 306 made during previous system boots in a similar manner as described for the currently-measured distance data value of current step 306, and then stored in step 314.

Methodology 300 proceeds from step 314 to step 316 as shown, where the touchpad driver executes to determine if all of a defined set of multiple most recent stored distance data values are within a predefined acceptable distance data value range (e.g., all of a set of multiple most recent distance data values that were stored during a predetermined number of days such as during the past seven days or another selected greater or lesser time period). An acceptable distance data value range may be defined by a predefined minimum distance data value threshold (MDVT) that is stored on non-volatile system storage at the factory by the manufacturer or assembler of system 100. This predefined MDVT represents the maximum acceptable amount of battery system component swelling, i.e., the distance data value decreases as component/s of the battery system 165 swell (i.e., due to swelling of battery cells 167) in a direction toward the capacitive proximity sensor electrode/s 143 as shown by the difference in measured distance data value (DDV) between FIG. 4 and FIG. 5.

Figure 5:
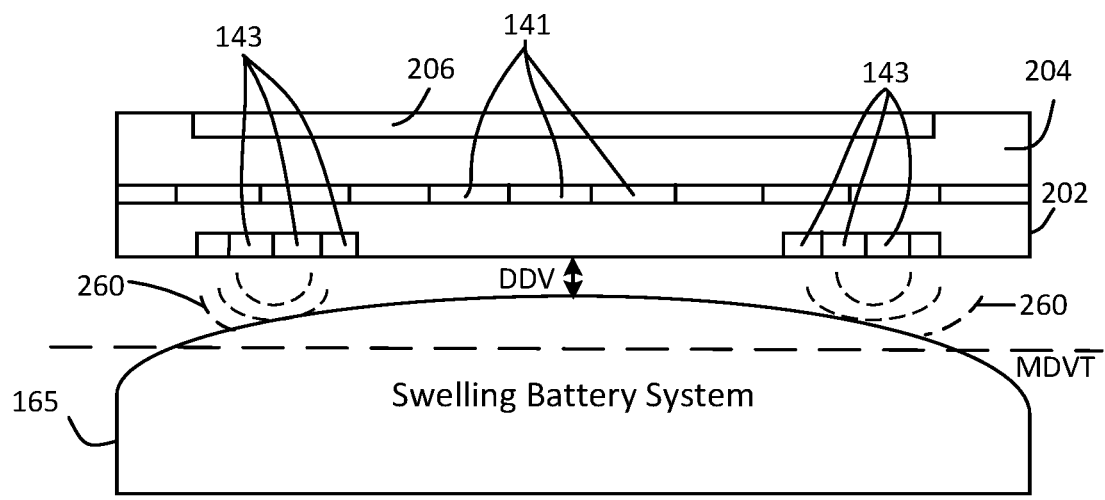
FIG. 5 illustrates an edge cross-sectional view of a touchpad system and a battery system to one exemplary embodiment of the disclosed systems and methods.

If it is determined in step 316 that one or more of the distance data values in the set of multiple most recent distance data values are not within the predefined acceptable distance data value range, then methodology 300 proceeds to step 320 where the touchpad driver 109 executing on host programmable integrated circuit 105 sends a command to EC 183 that instructs EC 183 to stop charging of battery cells 167. An example of such an unacceptable battery system swelling condition is illustrated in the side cross-sectional view of FIG. 5, where a measured distance data value (DDV) between components of battery system 165 and the capacitive proximity sensor electrode/s 143 is less than the predefined minimum distance data value threshold (MDVT). As shown, the unacceptable battery system swelling condition of FIG. 5 is detected using capacitive proximity sensor electrodes 143 without any contact with the swollen battery system 165.

Also in step 320, touchpad driver 109 may also automatically take an alarm action to alert the system user, such as by providing an instruction to display controller 120 to cause display of an alarm text message on display 125 to alert a user of system 100 that system maintenance is needed because unacceptable battery system component swelling has been detected, and charging of battery cells 167 has been stopped.

Upon receipt of the command from programmable integrated circuit 105 in step 320, EC 183 in turn provides a stop-charging command to BMU 166 via battery system data bus 181. BMU 166 responds to this received stop-charging command in step 322 by controlling switching circuitry 169 within battery system 165 to stop or terminate flow of charging current across power conductor/s 163 to battery cells 167 from battery charger and power circuitry 160 during the following OS runtime session.

If it is determined in step 316 that all the distance data values in the set of multiple most recent distance data values are within the predefined acceptable distance data value range, then methodology 300 proceeds to step 318 where normal battery charging behavior is allowed to proceed (i.e., no command is sent to EC 183 to instruct EC 183 to stop charging of battery cells 167 and no alarm action is presented to the system user) and system 100 continues OS runtime with normal charging of battery cells 167 allowed. An example of such an acceptable battery system condition is illustrated in the side cross-sectional view of FIG. 4, where a measured distance data value (DDV) between components of battery system 165 and the capacitive proximity sensor electrode/s 143 is greater than or equal to the predefined minimum distance data value threshold (MDVT).

It will be understood that the illustrated steps of methodology 300 are exemplary only, and that any other combination of fewer, additional and/or alternative steps may be employed that is suitable to employ capacitive-proximity sensing to automatically detect one or more swollen components of a battery system inside an outer chassis enclosure of an information handling system, and to respond to detection of swollen battery components by disabling battery cell charging and/or taking one or more alarm actions to alert a system user of the swollen condition of the battery system component/s. It will further be understood that the methodology of one or more of the steps of methodology 300 may be implemented using alternative configurations of programmable integrated circuits of system 100. For example, in one exemplary embodiment, one or more aspects of evaluation of acceptability of current distance data value and historical measured distance data values together with battery charging control and alarm generation functionalities described for touchpad driver 109 and/or EC 183 in steps 310, 312, 314, 316, 318, 320 and/or 322 may be alternatively implemented by a programmable integrated circuit within battery system 165 (e.g., such as a programmable integrated circuit of BMU 166 or other programmable integrated circuit) rather than by touchpoint driver 109 and/or EC 183.

It will also be understood that in other embodiments the disclosed systems and methods may be implemented with types of proximity sensors other than capacitive proximity sensors. Examples of such other types of proximity sensors include, but are not limited to, ultrasonic proximity sensors, infrared proximity sensors, laser proximity sensors, etc. In such other embodiments, another type of sensor suitable for detecting proximity of component/s (e.g., surface) of a battery system may be substituted for the capacitive proximity sensors illustrated and described in relation to the Figures herein. In such other embodiments, one or more suitable programmable integrated circuits may be coupled to the provided other type of proximity sensor/s and programmed to receive and process the proximity sensor signals received therefrom in a manner similar to that described herein for capacitive proximity sensor/s.

It will also be understood that one or more of the tasks, functions, or methodologies described herein (e.g., including those described herein for components 105, 120, 142, 166, 183, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising detecting swelling of a battery system contained within a chassis enclosure of an information handling system without physically contacting the battery, the method further comprising:
    sensing a proximity of the battery system to a first location within the chassis enclosure, the first location being separate from and external to the battery system;
    detecting swelling of the battery system without physically contacting the battery by determining whether the sensed proximity of the battery system indicates existence of battery system swelling; and
    taking at least one first action only upon determining swelling of the battery system exists, and not taking the at least one first action when no swelling of the battery system is determined to exist.

2. The method of claim 1, where the first action comprises at least one of automatically providing an alarm to a system user or automatically terminating charging of the battery system.

3. The method of claim 1, where the first location is spaced apart from the battery system within the chassis enclosure; and where the sensing comprises using at least one capacitive proximity sensor at the first location to sense physical proximity of the battery system to the capacitive proximity sensor by detecting a capacitance value of electrically-conductive components of the battery system.

4. The method of claim 3, where the at least one capacitive proximity sensor is mounted to a first side of a printed circuit board (PCB) at the first location to face toward the battery system and to face away from the first side of the PCB; and where the detecting swelling of the battery system comprises determining that the sensed physical proximity of the battery system to the at least one capacitive proximity sensor indicates existence of battery system swelling only when the sensed physical proximity of the battery system to the at least one capacitive proximity sensor is less than a predefined minimum distance data value threshold.

5. The method of claim 4, where at least one capacitive touch sensor is mounted at a second location to a second side of the PCB that is opposite from the first side of the PCB to face away from the second side of the PCB and to face toward an external touchpad surface of the information handling system with the at least one capacitive proximity sensor being positioned between the at least one capacitive touch sensor and the battery system; and where the method further comprises using the at least one capacitive touch sensor to detect presence and position of one or more user fingers touching the external touchpad surface.

6. The method of claim 5, further comprising:
    providing a voltage excitation from a same voltage driver of a microcontroller that is mounted to the first side of the PCB to each of the at least one capacitive proximity sensor and the at least one capacitive touch sensor;
    receiving each of a first sensed analog capacitance signal from the at least one capacitive proximity sensor and a second sensed analog capacitance signal from the at least one capacitive touch sensor in the same microcontroller that is mounted to the first side of the PCB;
    converting the first sensed analog capacitance signal to a first sensed digital capacitance signal, and converting the second sensed analog capacitance signal to a second sensed digital capacitance signal; and
    using at least one programmable integrated circuit to detect swelling of the battery system from the first sensed digital capacitance signal, and to detect presence and position of one or more user fingers touching the external touchpad surface from the second sensed capacitance signal.

7. The method of claim 5, where the at least one capacitive touch sensor and the at least one capacitive proximity sensor are mounted to face away from each other and to sense capacitance in opposite directions from each other.

8. The method of claim 3, where the at least one capacitive proximity sensor comprises multiple matrices of capacitive proximity sensor electrodes.

9. A method, comprising detecting swelling of a battery system contained within a chassis enclosure of an information handling system without physically contacting the battery, the method further comprising:
    sensing a proximity of the battery system to a first location within the chassis enclosure, the first location being separate from and external to the battery system;
    detecting swelling of the battery system by determining whether the sensed proximity of the battery system indicates existence of battery system swelling; and
    taking at least one first action only upon determining swelling of the battery system exists, and not taking the at least one first action when no swelling of the battery system is determined to exist;

where the method further comprises:
  receiving a first sensed capacitance signal in at least one programmable integrated circuit of the information handling system from at least one capacitive proximity sensor of the information handling system that faces toward the battery system,
  receiving a second sensed capacitance signal in at least one programmable integrated circuit of the information handling system from the at least one capacitive touch sensor of the information handling system that faces toward an external touchpad surface of the information handling system,
  using at least one programmable integrated circuit of the information handling system to detect swelling of the battery system from the first sensed capacitance signal, and
  using at least one programmable integrated circuit of the information handling system to detect presence and position of one or more user fingers touching the external touchpad surface from the second sensed capacitance signal.

10. A method, comprising detecting swelling of a battery system contained within a chassis enclosure of an information handling system without physically contacting the battery, the method further comprising:
  sensing a proximity of the battery system to a first location within the chassis enclosure, the first location being separate from and external to the battery system;
  detecting swelling of the battery system by determining whether the sensed proximity of the battery system indicates existence of battery system swelling; and
  taking at least one first action only upon determining swelling of the battery system exists, and not taking the at least one first action when no swelling of the battery system is determined to exist;
  where the first location is spaced apart from the battery system within the chassis enclosure; where the sensing the proximity to the battery system comprises using at least one capacitive proximity sensor at the first location to sense magnitude of capacitance value at the first location and converting the sensed capacitance magnitude value at the first location to a measured value of the distance (D) between the capacitive proximity sensor and the battery system; where the detecting swelling of the battery system comprises:
    comparing the value of the measured distance (D) to a predefined minimum distance data value threshold, and
    determining swelling of the battery system exists when the measured value of the distance (D) is less than the predefined minimum distance data value threshold.

11. The method of claim 10, where the information handling system is a notebook or laptop computer.

12. A method, comprising detecting swelling of a battery system contained within a chassis enclosure of an information handling system without physically contacting the battery, the method further comprising:
  sensing a proximity of the battery system to a first location within the chassis enclosure, the first location being separate from and external to the battery system;
  detecting swelling of the battery system by determining whether the sensed proximity of the battery system indicates existence of battery system swelling; and
  taking at least one first action only upon determining swelling of the battery system exists, and not taking the at least one first action when no swelling of the battery system is determined to exist;
  where the first location is spaced apart from the battery system within the chassis enclosure; where detecting swelling of the battery system further comprises:
    using at least one capacitive proximity sensor at the first location to sense multiple magnitudes of capacitance value at successive times at the first location,
    converting the multiple successive sensed capacitance magnitude values at the first location to multiple respective values of measured distance (D) between the capacitive proximity sensor and the battery system,
    determining swelling of the battery system exists when at least one of the multiple respective values of measured distance (D) is less than the predefined minimum distance data value threshold, and
    determining no swelling of the battery system exists when none of the multiple respective values of measured distance (D) is less than the predefined minimum distance data value threshold.

13. An information handling system, comprising:
  a battery system contained within a chassis enclosure;
  at least one proximity sensor that does not physically contact the battery system and that is positioned at a first location that is separate from and external to the battery system, the proximity sensor sensing physical proximity of the battery system to the proximity sensor and producing a first signal that is representative of the sensed proximity of the battery system; and
  at least one programmable integrated circuit coupled to receive the first signal from the at least one proximity sensor, the at least one programmable integrated circuit being programmed to:
    detect swelling of the battery system by determining whether the sensed proximity of the battery system indicates existence of battery system swelling without physically contacting the battery; and
    take at least one first action only upon determining swelling of the battery system exists, and not take the at least one first action when no swelling of the battery system is determined to exist.

14. The information handling system of claim 13, where the first action comprises at least one of automatically providing an alarm to a system user or automatically terminating charging of the battery system.

15. The information handling system of claim 13, where the first location is spaced apart from the battery system within the chassis enclosure; where the at least one proximity sensor is a capacitive proximity sensor sensing magnitude of a capacitance value of electrically-conductive components of the battery system at the first location to produce the first signal.

16. The information handling system of claim 15, where the at least one capacitive proximity sensor is mounted to a first side of a printed circuit board (PCB) at the first location to face toward the battery system and to face away from the first side of the PCB; and where the at least one programmable integrated circuit is programmed to detect swelling of the battery system by determining that the sensed physical proximity of the battery system to the at least one capacitive proximity sensor indicates existence of battery system swelling only when the sensed physical proximity of the battery system to the at least one capacitive proximity sensor is less than a predefined minimum distance data value threshold.

17. The information handling system of claim 16, further comprising:

a touchpad having an external touchpad surface; and
at least one capacitive touch sensor mounted at a second location to a second side of the PCB that is opposite from the first side of the PCB to face away from the second side of the PCB and to face toward the external touchpad surface of the information handling system with the at least one capacitive proximity sensor being positioned between the at least one capacitive touch sensor and the battery system, the capacitive touch sensor producing a second signal that is representative of a sensed presence and position of one or more user fingers touching the external touchpad surface;
where the at least one programmable integrated circuit is coupled to receive the second signal from the at least one capacitive touch sensor.

18. The information handling system of claim 17, where the at least one programmable integrated circuit comprises a microcontroller that is mounted to the first side of the PCB and that is coupled to provide a voltage excitation from a voltage driver of the microcontroller to each of the at least one capacitive proximity sensor and the at least one capacitive touch sensor, receive the first signal as a first sensed analog capacitance signal from the at least one capacitive proximity sensor and to receive the second signal as a second sensed analog capacitance signal from the at least one capacitive touch sensor, and convert the first sensed analog capacitance signal to a first sensed digital capacitance signal and convert the second sensed analog capacitance signal to a second sensed digital capacitance signal; and where the at least one programmable integrated circuit is programmed to:
 detect swelling of the battery system from the first sensed digital capacitance signal; and
 detect the presence and the position of the one or more user fingers touching the external touchpad surface from the second sensed digital capacitance signal.

19. The information handling system of claim 17, where the at least one capacitive touch sensor and the at least one capacitive proximity sensor are mounted to face away from each other and to sense capacitance in opposite directions from each other.

20. The information handling system of claim 13, where the at least one proximity sensor comprises multiple matrices of capacitive proximity sensor electrodes.

21. An information handling system, comprising:
a battery system contained within a chassis enclosure;
at least one proximity sensor that does not physically contact the battery system and that is positioned at a first location that is separate from and external to the battery system, the proximity sensor sensing physical proximity of the battery system to the proximity sensor and producing a first signal that is representative of the sensed proximity of the battery system; and
at least one programmable integrated circuit coupled to receive the first signal from the at least one proximity sensor, the at least one programmable integrated circuit being programmed to:
 detect swelling of the battery system by determining whether the sensed proximity of the battery system indicates existence of battery system swelling; and
 take at least one first action only upon determining swelling of the battery system exists, and not take the at least one first action when no swelling of the battery system is determined to exist;
where the at least one proximity sensor is a capacitive proximity sensor that faces toward the battery system and coupled to provide the first signal to the at least one programmable integrated circuit; and where the information handling system further comprises:
a touchpad having an external touchpad surface; and
at least one capacitive touch sensor that faces toward the external touchpad surface of the information handling system, the capacitive touch sensor coupled to provide a second signal to the at least one programmable integrated circuit that is representative of a sensed presence and position of one or more user fingers touching the external touchpad surface;
where the at least one programmable integrated circuit is programmed to:
 detect swelling of the battery system from the first signal, and
 detect presence and position of one or more user fingers touching the external touchpad surface from the second signal.

22. An information handling system, comprising:
a battery system contained within a chassis enclosure;
at least one proximity sensor that does not physically contact the battery system and that is positioned at a first location that is separate from and external to the battery system, the proximity sensor sensing physical proximity of the battery system to the proximity sensor and producing a first signal that is representative of the sensed proximity of the battery system; and
at least one programmable integrated circuit coupled to receive the first signal from the at least one proximity sensor, the at least one programmable integrated circuit being programmed to:
 detect swelling of the battery system by determining whether the sensed proximity of the battery system indicates existence of battery system swelling; and
 take at least one first action only upon determining swelling of the battery system exists, and not take the at least one first action when no swelling of the battery system is determined to exist;
where the at least one proximity sensor is a capacitive proximity sensor sensing magnitude of capacitance value at the first location to produce the first signal; where the first location is spaced apart from the battery system within the chassis enclosure; and where the at least one programmable integrated circuit is coupled to receive the first signal from the capacitive proximity sensor, the at least one programmable integrated circuit being programmed to:
 convert the sensed capacitance magnitude value at the first location to a measured value of the distance (D) between the capacitive proximity sensor and the battery system, and
 detect swelling of the battery system by comparing the value of the measured distance (D) to a predefined minimum distance data value threshold, and determining swelling of the battery system exists when the measured value of the distance (D) is less than the predefined minimum distance data value threshold.

23. The information handling system of claim 22, where the information handling system is a notebook or laptop computer.

24. An information handling system, comprising:
a battery system contained within a chassis enclosure;
at least one proximity sensor that does not physically contact the battery system and that is positioned at a first location that is separate from and external to the battery system, the proximity sensor sensing physical proximity of the battery system to the proximity sensor and producing a first signal that is representative of the sensed proximity of the battery system; and at least one programmable integrated circuit coupled to receive the first signal from the at least one proximity sensor, the at least one programmable integrated circuit being programmed to:

detect swelling of the battery system by determining whether the sensed proximity of the battery system indicates existence of battery system swelling; and take at least one first action only upon determining swelling of the battery system exists, and not take the at least one first action when no swelling of the battery system is determined to exist;

where the first location is spaced apart from the battery system within the chassis enclosure; and where the at least one programmable integrated circuit is programmed to:

use the first signal from the at least one capacitive proximity sensor to sense multiple magnitudes of capacitance value at successive times at the first location, convert the multiple successive sensed capacitance magnitude values at the first location to multiple respective values of measured distance (D) between the capacitive proximity sensor and the battery system, determine swelling of the battery system exists when at least one of the multiple respective values of measured distance (D) is less than the predefined minimum distance data value threshold, and determine no swelling of the battery system exists when none of the multiple respective values of measured distance (D) is less than the predefined minimum distance data value threshold.

* * * * *